United States Patent
Yoo et al.

(10) Patent No.: US 9,567,429 B2
(45) Date of Patent: *Feb. 14, 2017

(54) POLYLACTIC ACID RESIN FILM

(76) Inventors: Young-Man Yoo, Seoul (KR); Jae-Il Chung, Gyeonggi-do (KR); Tae-Woong Lee, Gyeonggi-do (KR); Kye-Yune Lee, Gyeonggi-do (KR)

( * ) Notice: Subject to any disclaimer, the term of this patent is extended or adjusted under 35 U.S.C. 154(b) by 618 days.

This patent is subject to a terminal disclaimer.

(21) Appl. No.: 13/981,135

(22) PCT Filed: Nov. 2, 2011

(86) PCT No.: PCT/KR2011/008308
§ 371 (c)(1),
(2), (4) Date: Oct. 1, 2013

(87) PCT Pub. No.: WO2012/102463
PCT Pub. Date: Aug. 2, 2012

(65) Prior Publication Data
US 2014/0037931 A1  Feb. 6, 2014

(30) Foreign Application Priority Data

Jan. 25, 2011 (KR) .......... 10-2011-0007365
Jan. 25, 2011 (KR) .......... 10-2011-0007366
Jan. 25, 2011 (KR) .......... 10-2011-0007367

(51) Int. Cl.
C08G 63/685 (2006.01)
C08J 5/18 (2006.01)
C08G 18/40 (2006.01)
C08G 18/42 (2006.01)
C08L 75/06 (2006.01)

(52) U.S. Cl.
CPC ......... *C08G 63/685* (2013.01); *C08G 18/4018* (2013.01); *C08G 18/428* (2013.01); *C08J 5/18* (2013.01); *C08L 75/06* (2013.01); *C08J 2367/04* (2013.01); *C08J 2375/06* (2013.01)

(58) Field of Classification Search
CPC . C08G 18/4018; C08G 18/428; C08G 63/685; C08J 5/18; C08J 2367/04; C08J 2375/06; C08L 75/06; Y10T 428/31786
See application file for complete search history.

(56) References Cited

U.S. PATENT DOCUMENTS 6,703,115 B2  3/2004  Hale et al.
6,960,374 B1  11/2005  Terada et al.
2002/0155268 A1*  10/2002  Toyoda ........... B29C 55/14 428/220
2006/0193789 A1  8/2006  Tamarkin et al.
2009/0274885 A1  11/2009  Egawa
2010/0151219 A1*  6/2010  Busch ............. B29C 55/16 428/220
2011/0003917 A1  1/2011  Negishi et al.

FOREIGN PATENT DOCUMENTS

| CN | 1621433 | 6/2005 |
|---|---|---|
| JP | H08-85722 | 4/1996 |
| JP | H08-295727 | 11/1996 |
| JP | 10-101778 A1 * | 1/1998 |
| JP | 2002-088145 | 3/2002 |
| JP | 2002-347184 A | 12/2002 |
| JP | 2004-250697 | 9/2004 |
| JP | 2010-215703 | 9/2010 |
| KR | 10-0675606 B1 | 1/2007 |
| KR | 10-0895233 B1 | 5/2009 |
| KR | 10-2010-0126770 A | 12/2010 |

OTHER PUBLICATIONS

Zeng et al. ("A novel biodegradable multiblock poly(ester urethane) containing poly(L-lactic acid) and poly(butylene succinate) blocks" Polymer, 2009, 50, p. 1178-1186).*
JP 10-101778 A1 Machine Translation.*
International Search Report prepared by the Korean Intellectual Property Office on May 23, 2012, for International Application No. PCT/KR2011/008308.

* cited by examiner

*Primary Examiner* — Maria Veronica Ewald
*Assistant Examiner* — Travis Figg

(57) ABSTRACT

The present invention relates to a polylactic acid resin film which has excellent flexibility, mechanical properties, stability, and transparency while having a specific biodegradability of the polylactic acid resin, and is useful as a packaging material.

The present invention provides a polylactic acid resin film, comprising a polylactic acid resin including a hard segment comprising a specific polylactic acid repeating unit, and a soft segment comprising a polyurethane polyol repeating unit in which a specific polyether polyol repeating units are linearly linked via a urethane bond, wherein the total Young's modulus in both machine direction and transverse direction of the film is 350 to 750 kgf/mm$^2$, and the total initial tensile strength in both machine direction and transverse direction of the film is 20 kgf/mm$^2$ or more.

13 Claims, No Drawings

POLYLACTIC ACID RESIN FILM

CROSS REFERENCE TO RELATED APPLICATIONS

This application is a national stage application under 35 U.S.C. 371 and claims the benefit of PCT Application No. PCT/KR2011/008308 having an international filing date of Nov. 2, 2011, which designated the United States, and which PCT application claimed the benefit of Korean Patent Application No. 10-2011-0007365 filed Jan. 25, 2011; Korean Patent Application No. 10-2011-0007366 filed Jan. 25, 2011; and Korean Patent Application No. 10-2011-0007367 filed Jan. 25, 2011, the disclosure of which is incorporated herein by reference.

TECHNICAL FIELD

The present invention relates to a polylactic acid resin film. More particularly, the present invention relates to a polylactic acid resin film having not only biodegradability as a polylactic acid resin but also excellent flexibility, mechanical properties, stability, and transparency as a packaging material.

This application claims the benefit of Korean Patent Application Nos. 10-2011-0007365, 10-2011-0007366, and 10-2011-0007367 filed on Jan. 25, 2011, the disclosures of all of which are hereby incorporated by reference in its entirety into this application.

BACKGROUND OF THE ART

Most conventional polymers derived from petroleum resources such as polyethylene terephthalate (PET), nylon, polyolefin and polyvinyl chloride (PVC) resins, have been used for materials for a wide range of applications such as packaging materials. However, these polymers are resistant to biodegradation and related to environmental issues like carbon dioxide gas, which causes the global warming on the waste treatment processes. In addition, there have been wide studies on the use of biomass-based resins showing biodegradability, polylactic acid resin representatively, following the depletion of petroleum resources.

However, as polylactic acid derived from plants is lower in heat resistance, mechanical properties, and the like than petroleum-based resins, there have been limitations of the fields and applications to which it is applicable. Particularly, attempts have been made to use polylactic acid resins as packaging materials such as packaging films, but they have failed due to the poor flexibility of polylactic acid resins.

In order to overcome the problems of polylactic acid resins, it has been suggested that low-molecular weight flexibilizers or plasticizers be added to polylactic acid resins, or plasticizers produced by addition polymerization of polyether-based or aliphatic polyester-based polyol be applied to the polylactic acid resins.

However, there is little improvement of flexibility in most of the packaging films comprising polylactic acid resins which are produced according to these methods. Moreover, the films are unsuitable for packaging materials because the films show poor stability as the plasticizers bleed out and contaminate the packaged contents over time. Furthermore, the packaging films have the disadvantages of an increase in haze together with a decrease in transparency. In most cases of conventional methods, the films are unsuitable as packaging materials because an improvement in flexibility of the films results in a great decrease in mechanical properties or anti-blocking properties.

Accordingly, there is a continuous demand for a packaging film which has optimized properties such as excellent flexibility, mechanical properties, stability, and transparency as well as biodegradability.

DETAILED DESCRIPTION OF THE INVENTION

Technical Objectives

It is therefore an object of the present invention to provide a polylactic acid resin film having not only a biodegradability as a polylactic acid resin but also optimized properties such as excellent flexibility, mechanical properties, stability, transparency, and so on.

Technical Solutions

The present invention provides a polylactic acid resin film, comprising a polylactic acid resin including a hard segment comprising a polylactic acid repeating unit of the following Chemical Formula 1, and a soft segment comprising a polyurethane polyol repeating unit in which polyether polyol repeating units of the following Chemical Formula 2 are linearly linked via a urethane bond, wherein the total Young's modulus in both machine direction and transverse direction of the film is 350 to 750 kgf/mm², and the total initial tensile strength in both machine direction and transverse direction of the film is 20 kgf/mm² or more:

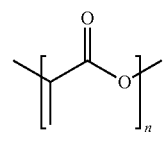

[Chemical Formula 1]

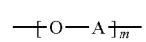

[Chemical Formula 2]

wherein, A is a linear or branched alkylene of 2 to 5 carbon atoms, m is an integer of 10 to 100, and n is an integer of 700 to 5000.

Hereinafter, a polylactic acid resin film according to a specific embodiment of the present invention will be explained in detail.

According to one embodiment, the present invention provides a polylactic acid resin film, comprising a polylactic acid resin including a hard segment comprising a polylactic acid repeating unit of the following Chemical Formula 1, and a soft segment comprising a polyurethane polyol repeating unit in which polyether polyol repeating units of the following Chemical Formula 2 are linearly linked via a urethane bond, wherein the total Young's modulus in both machine direction and transverse direction of the film is about 350 to 750 kgf/mm², the total initial tensile strength in both machine direction and transverse direction of the film is about 20 kgf/mm² or more:

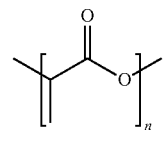

[Chemical Formula 1]

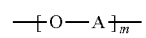

[Chemical Formula 2]

wherein, A is a linear or branched alkylene of 2 to 5 carbon atoms, m is an integer of 10 to 100, and n is an integer of 700 to 5000.

The polylactic acid resin, the main component of the film, comprises a polylactic acid repeating units represented by Chemical Formula 1 basically as a hard segment. And, the polylactic acid resin comprises a polyurethane polyol repeating unit as a soft segment in which polyether polyol repeating units of Chemical Formula 2 are linearly linked via a urethane bond (—C(=O)—NH—).

Such polylactic acid resin and the film have biodegradability which is characteristic of biomass-based resins, as comprising the polylactic acid repeating units as a hard segment. In addition, according to experiment data obtained by the present inventors, it is suggested that the polylactic acid resin appeared improved flexibility, and allowed the production of a film with high transparency, low haze, and improved stability by comprising the polyurethane polyol repeating units as a soft segment.

Furthermore, the film made of the polylactic acid resin may exhibit a total Young's modulus in both machine direction and transverse direction of about 350 to 750 $kgf/mm^2$, preferably about 450 to 650 $kgf/mm^2$, and more preferably about 500 to 600 $kgf/mm^2$, and a total initial tensile strength in both machine direction and transverse direction of about 20 $kgf/mm^2$ or more, and preferably about 20 to 60 $kgf/mm^2$, when the film with dimensions of a width of 10 mm and a length of 150 mm is subjected to a tensile test using Instron 1123 UTM at the temperature of 20° C., the relative humidity of 65%, and the drawing speed of 300 mm/min with the distance between grips of 100 mm. Such properties of the film may be caused by the structural characteristic of the polylactic acid resin disclosed above.

Particularly, the polylactic acid resin may comprise a block copolymer prepared by copolymerizing a polylactic acid repeating unit with a polyurethane polyol repeating unit in which polyether polyol repeating units are linearly linked via a urethane bond as a result of reaction with a diisocyanate compound. As the polylactic acid resin includes the block copolymer obtained like this, the film including the resin can exhibit optimized characteristics not only in flexibility but also in general properties such as mechanical properties. For example, it can satisfy the total Young's modulus range and the total initial tensile strength range disclosed above. Furthermore, such excellent properties of the film may result from the optimized preparation method or form (for example, a form of bi-axially oriented film) of the film disclosed below. And, as the polylactic acid resin includes the block copolymer, the bleed-out of the soft segment components or the residual monomers decreases. Thus, the film can exhibit excellent stability and relatively low weight loss even after the heat-treatment of high temperature. And the film can exhibit excellent transparency and low haze due to the decrease of bleed-out.

Meanwhile, as the film satisfies the specific range of the total Young's modulus, the film can exhibit the flexibility and stiffness optimized to the packaging films. However, when the total Young's modulus is too low, the film may undergo spreading or loosing phenomena during a film formation process, and exhibit poor workability, gas permeability, slit forming property, or dimensional stability. In addition, the deficient slipping property causes a poor release property or makes it difficult to use the film as a wrap film because the film deforms before wrapping a good such as a vessel or a food. On the other hand, when the total Young's modulus is too high, a folding line may remain giving a poor appearance once it is formed in the film, or excessively high stiffness of the film gives rise to the loud noise. Moreover, the film is too stiff to take shape according to the shape of food And, the film satisfies the specific total initial tensile strength range disclosed above when the tensile test is carried out under the same condition as in the Young's modulus test. When the initial tensile strength is behind the range, the handling property of the film may become poor and the film may be easily broken and may cause damage to the contents. In contrast, the film of one embodiment satisfies the specific total initial tensile strength range and thus it can exhibit superior mechanical properties preferable for packaging.

Therefore, the polylactic acid resin film of one embodiment exhibits not only biodegradability but also optimized properties such as excellent flexibility, mechanical properties, stability, transparency, and so on, and thus it can be used very preferably for packaging and the like.

Hereinafter, the film of one embodiment is explained in more detail. Firstly, the polylactic acid resin, the main component of the film, is explained in detail and then the film including the same is explained in detail.

In the polylactic acid resin included in the film, the polylactic acid repeating unit of Chemical Formula 1 included in the hard segment may refer to a polylactic acid homopolymer or a repeating unit of the homopolymer. This polylactic acid repeating unit may be obtained according to a typical method for preparing a polylactic acid homopolymer. For example, it can be obtained by the method of forming an L- or D-lactide, a cyclic diester of lactic acid, from L- or D-lactic acid and carrying out a ring-opening polymerization of the same, or by the method of direct polycondensation of L- or D-lactic acid. Among them, the ring-opening polymerization method is preferable because it can give the polylactic acid repeating unit having higher degree of polymerization. In addition, the polylactic acid repeating unit may be prepared by copolymerizing L-lactide and D-lactide at such a certain ratio so as to make the copolymer non-crystalline, but the polylactic acid repeating unit is preferably prepared by homopolymerization of either L-lactide or D-lactide in order to increase the heat resistance of the film comprising the polylactic acid resin. More specifically, an L- or D-lactide material with optical purity of about 98% or higher may be subjected to ring-opening polymerization to give the polylactic acid repeating unit. Lower optical purity might decrease the melting temperature (Tm) of the polylactic acid resin.

Also, the polyurethane polyol repeating unit of the soft segment has a structure in which the polyether polyol repeating units of Chemical Formula 2 are linearly linked via a urethane bond (—C(=O)—NH—). More specifically, the polyether polyol repeating unit refers to a polymer prepared from a monomer such as alkylene oxide by ring-opening (co)polymerization, or a repeating unit of the polymer, and it may have a hydroxyl group at its end. This terminal hydroxyl group may be reacted with a diisocyanate compound to form a urethane bond (—C(=O)—NH—), and thus the polyether polyol repeating units are linearly linked to each other to afford the polyurethane polyol repeating unit. By including such polyurethane polyol repeating unit as a soft segment, the flexibility of the film including the polylactic acid resin can be improved largely. In addition, the polyurethane polyol repeating unit makes it possible to provide the film having excellent properties without deteriorating heat resistance, anti-blocking property, mechanical properties, or transparency of the polylactic acid resin or the film including the same.

On the other hand, polylactic acid copolymers comprising a soft segment in which polyester polyol repeating units are linked via a urethane bond has been already known. However, there are some problems that the film including the polylactic acid copolymer has low transparency and high haze due to low compatibility between polyester polyol and polylactic acid. Furthermore, the condition of film extrusion is not good because such polylactic acid copolymers has wide molecular weight distribution and excessively low glass transition temperature, and thus the film produced has insufficient mechanical properties, heat resistance, and anti-blocking property.

In addition, it has already been known that polylactic acid copolymers in which tri- or higher functional isocyanate compounds are used to copolymerize polyether polyol repeating units with polylactic acid repeating units in a branch pattern, or polylactic acid copolymers in which a copolymer of polyether polyol repeating units and polylactic acid repeating units is extended by a urethane reaction. But, they also have problems that heat resistance, mechanical properties, and anti-blocking property of the film are not sufficient because the block size of the polylactic acid repeating unit as a hard segment is too small and the glass transition temperature of the polylactic acid copolymer is too low. Moreover, the operating conditions of the film extrusion process is not good due to wide molecular weight distribution and poor melting characteristics of the polylactic acid copolymer.

Furthermore, it seems that the degradation of the polylactic acid copolymer occurs during the preparation or use of the film because an excessive catalyst was used in the polymerization process of the polylactic acid copolymer. And, it is recognized that this problem gives rise to low stability, high haze and poor transparency, pin hole formation, and the like.

In contrast, The polylactic acid resin included in the film of one embodiment comprises a polyurethane polyol repeating unit in which multiple polyether polyol repeating units are linearly linked via a urethane bond. Therefore, it has an optimized glass transition temperature and narrow molecular weight distribution. Moreover, it can provide the film having excellent mechanical properties, heat resistance, and anti blocking property, and so on as well as excellent flexibility because it has large segments of the polylactic acid repeating unit and the polyurethane polyol repeating unit. Accordingly, the polylactic acid resin included in the film of one embodiment is found to overcome the problems that the previous copolymers retain, and can be produced into films which exhibit excellent properties including superior transparency and stability as well as greatly improved flexibility.

The polyether polyol repeating unit and the diisocyanate compound may be reacted with each other at a molar ratio of about 1:0.50 to 1:0.99 for the terminal hydroxyl group of the polyether polyol repeating unit: the isocyanate group of diisocyanate compound to form the polyurethane polyol repeating unit. The reaction molar ratio of the terminal hydroxyl of the polyether polyol repeating unit and the isocyanate group of diisocyanate compound may preferably range from about 1:0.60 to 1:0.90, and more preferably from about 1:0.70 to 1:0.85.

As will be explained below, the polyurethane polyol repeating unit refers to a polymer in which the polyether polyol repeating units are linearly linked via a urethane bond, or a repeating unit of the polymer, and may have a hydroxyl group at its terminal. Accordingly, the polyurethane polyol repeating unit may act as an initiator for the formation of the polylactic acid repeating unit in the polymerization process. When the molar ratio of the terminal hydroxyl group: isocyanate group exceeds about 0.99, the number of terminal hydroxyl groups of the polyurethane polyol repeating unit is so insufficient (OHV<3) that the polyurethane polyol repeating unit cannot suitably act as an initiator. On the other hand, when the molar ratio of the hydroxyl group: the isocyanate group is too low, the terminal hydroxyl group of the polyurethane polyol repeating unit becomes too abundant (OHV>21) to obtain polylactic acid repeating units and polylactic acid resins with high-molecular weight.

Meanwhile, the polyether polyol repeating unit may be a polyether polyol (co)polymer prepared by a ring-opening (co)polymerization of one or more alkylene oxide monomers, or a repeating unit thereof, for example. Examples of the alkylene oxide monomers include ethylene oxide, propylene oxide, butylene oxide and tetrahydrofuran. The polyether polyol repeating unit prepared from the monomers may be exemplified by a repeating unit of polyethylene glycol (PEG); a repeating unit of poly(1,2-propylene glycol); a repeating unit of poly(1,3-propanediol); a repeating unit of polytetramethylene glycol; a repeating unit of polybutylene glycol; a repeating unit of a polyol copolymerized from propylene oxide and tetrahydrofuran; a repeating unit of a polyol copolymerized from ethylene oxide and tetrahydrofuran; and a repeating unit of a polyol copolymerized from ethylene oxide and propylene oxide. Considering the ability to endow the polylactic acid resin film with flexibility, affinity to the polylactic acid repeating unit, and water content property, a repeating unit of poly(1,3-propanediol) or polytetramethylene glycol may be preferably used as the polyether polyol, and the polyether polyol repeating unit may have a number average molecular weight of about 400 to 9000, and preferably about 1000 to 3000.

And, the diisocyanate compound may be any compound which has two isocyanate groups, so long as it can form a urethane bond with the terminal hydroxyl group of the polyether polyol repeating unit. Examples of the diisocyanate compounds include 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, hexamethylene diisocyanate, isophorone diisocyanate, and hydrogenated diphenylmethane diisocyanate. In addition, various other diisocyanate compounds well known to those who skilled in the art may be used without particular limitations. Considering the ability to endow the polylactic acid resin with flexibility, 1,6-hexamethylene diisocyanate is preferred.

Meanwhile, the polylactic acid resin included in the film of one embodiment may comprise a block copolymer in which said polylactic acid repeating units, the hard segment, are copolymerized with said polyurethane polyol repeating units, the soft segment. More specifically, the terminal carboxyl group of the polylactic acid repeating unit can be linked to the terminal hydroxyl group of the polyurethane polyol repeating unit via an ester bond in the block copolymer. For example, the chemical structure of the block copolymer may be represented by the following General Formula 1:

Polylactic acid repeating unit (L)-Ester-Polyurethane polyol repeating unit (E-U-E-U-E)-Ester-Polylactic acid repeating unit (L)     [General Formula 1]

wherein, E is a polyether polyol repeating unit, U is a urethane bond, and Ester is an ester bond.

As the resin comprises a block copolymer in which the polylactic acid repeating unit and the polyurethane polyol repeating unit are copolymerized, the film produced therefrom can have excellent transparency, mechanical properties, heat resistance or anti-blocking property while suppressing the bleed-out of the polyurethane polyol repeating unit for giving flexibility. Particularly, as the polylactic acid repeating unit and the polyurethane polyol repeating unit form a block-copolymer, the glass transition temperature (Tg) and the melting temperature (Tm) of the polylactic acid resin can be optimized, and it is made possible to improve the flexibility, anti-blocking property, heat resistance and so on of the film.

However, not all of the polylactic acid repeating units included in the polylactic acid resin need to be in the form of a block copolymer with the polyurethane polyol repeating unit, and at least some of the polylactic acid repeating units may not be bonded to the polyurethane polyol repeating unit but may take a form of a polylactic acid homopolymer. In this case, the polylactic acid resin takes a mixed form in which the block copolymer exists together with a polymer of the polylactic acid repeating unit remaining uncoupled with the polyurethane repeating unit, that is, a polylactic acid homopolymer.

Meanwhile, the polylactic acid resin may include about 80 to 95 wt % of the hard segment and about 5 to 20 wt % of the soft segment, preferably about 82 to 92 wt % of the hard segment and about 8 to 18 wt % of the soft segment, and most preferably about 85 to 90 wt % of the hard segment and about 10 to 15 wt % of the soft segment, per the total weight of the polylactic acid resin (the total weight of the block copolymer and the homopolymer when the polylactic acid homopolymer is included optionally).

If the content of the soft segment is excessively high, it is difficult to provide the polylactic acid resin of high-molecular weight, and mechanical properties such as strength of the film may decline. In addition, lowered glass transition temperature of the polylactic acid resin gives rise to poor slipping property, workability, anti-blocking property or dimensional stability in packaging process. On the other hand, if the content of the soft segment is excessively small, it is difficult to improve the flexibility of the polylactic acid resin and the film. Particularly, the glass transition temperature of the polylactic acid resin is increased excessively and flexibility of the film may be deteriorated. Furthermore, it is difficult for the polyurethane polyol repeating unit of the soft segment to function properly as an initiator, which results in a decrease in polymerization conversion rate or an impediment to the formation of high-molecular weight polylactic acid resin.

The polylactic acid resin may further include a phosphite-based stabilizer and/or antioxidant in order to prevent the oxidation or thermal degradation of the soft segment during the preparation process. As the antioxidant, a hindered phenol-based antioxidant, an amine-based antioxidant, a thio-based antioxidant, a phosphite-based antioxidant, and the like may be used. These kinds of stabilizers and antioxidants are well known to a person skilled in the art.

In addition to these stabilizers and antioxidants, the polylactic acid resin may contain various known additives, such as a plasticizer, a UV stabilizer, a color blocking agent, an anti-gloss agent, a deodorant, a flame retardant, an anti-weathering agent, an anti-static agent, a releasing agent, an antioxidant, an ion exchanger, a coloring pigment, and inorganic or organic particles, in such an amount so as not to have negative influences on the physical properties of the resin.

The examples of the plasticizer include phthalic acid ester plasticizers, such as phthalic acid diethyl, phthalic acid dioctyl, and phthalic acid dicyclohexyl; aliphatic dibasic acid ester plasticizers, such as adipic acid di-1-butyl, adipic acid di-n-octyl, sebacic acid di-n-butyl, and azelaic acid di-2-ethyl hexyl; phosphoric acid ester plasticizers, such as phosphoric acid diphenyl-2-ethyl hexyl and phosphoric acid diphenyl octyl; polyhydroxy carboxylic acid ester plasticizers, such as acetyl citric acid tributyl, acetyl citric acid tri-2-ethyl hexyl, and citric acid tributyl; aliphatic ester plasticizers, such as acetyl ricinoleic acid methyl, and stearic acid amyl; polyhydric alcohol ester plasticizers such as glycerin triacetate; and epoxy plasticizers, such as epoxylated soybean oil, epoxylated flaxseed oil fatty acid butyl ester, and epoxylated stearic acid octyl. And the examples of the coloring pigments may be inorganic pigments such as carbon black, titanium oxide, and zinc oxide; and organic pigments such as cyanines, phosphorous, quinines, perinones, isoindolinones, and thioindigos. Inorganic or organic particles may be used to improve the film in anti-blocking property, and the examples are silica, colloidal silica, alumina, alumina sol, talc, mica, calcium carbonate, polystyrene, poly methyl methacrylate, and silicon. Further, various additives applicable to polylactic acid resins or films thereof may be employed, and their kinds and acquisition routes are well known to those who skilled in the art.

Said polylactic acid resin, for example, the block copolymer contained therein, may have a number average molecular weight of about 50,000 to 200,000, and preferably of about 50,000 to 150,000. Also, the polylactic acid resin may have a weight average molecular weight of about 100,000 to 400,000, and preferably about 100,000 to 320,000. The molecular weight may influence mechanical properties of the polylactic acid resin. When the molecular weight is too small, the polylactic acid resin may be poorly processed into films upon a melting process such as extrusion because its melt viscosity is too low and the film, although obtained, has poor mechanical properties such as strength. On the other hand, when the molecular weight is excessively high, the resin may be processed into a film with a poor yield in a melting process because its melt viscosity is too high.

The polylactic acid resin, for example, the block copolymer contained therein, may have a molecular weight distribution (Mw/Mn), defined as a ratio of weight average molecular weight (Mw) to number average molecular weight (Mn), of about 1.60 to 2.20, and preferably about 1.80 to 2.15. Given such a narrow molecular weight distribution, the polylactic acid resin has proper melt viscosity and melting properties so that it can be processed and extruded into films in a melting process. In addition, a high physical property such as strength can be found in the film made of the polylactic acid resin. In contrast, when the molecular weight distribution is too narrow (small), the polylactic acid resin may be difficult to process into a film because its melt viscosity is too high at a processing temperature for extrusion. On the other hand, when the molecular weight distribution is too wide (large), the film may become poor in physical properties such as strength, and the resin may be difficult to produce into films or may be poorly extruded into a film because its melt viscosity is too small.

In addition, the polylactic acid resin, for example, the block copolymer contained therein, has a glass transition temperature (Tg) of about 25 to 55° C., and preferably of about 30 to 55° C. As the polylactic acid resin has above glass transition temperature range, the film including the polylactic acid resin can have optimized flexibility and stiffness and it can be used as a packaging film preferably. If the glass transition temperature of the polylactic acid resin is too low, the film exhibits excessively low stiffness even though it may have improved flexibility, and thus it may be poor in slipping property, workability, dimensional stability, heat resistance or anti-blocking property during a packaging process using the film and unsuitable to be applied to a packaging film. On the other hand, the film which has an excessively high glass transition temperature provides low flexibility and excessively high stiffness, so that it may be easily folded and the wrinkles therefrom do not disappear readily or it may exhibit the poor adhesion strength of adhesive interface to a target to be wrapped. In addition, it may cause the loud noise when it is used for packaging and there may be difficult to be used as a packaging film.

Also, the polylactic acid resin may have the melting temperature (Tm) of about 160 to 178° C., and preferably about 165 to 175° C. If the melting temperature is too low, the film made of the polylactic acid resin may be poor in heat resistance, and if the melting temperature is excessively high, the polylactic acid resin requires high temperature for a melting process such as extrusion or increases the viscosity, thus making it difficult to extrude the resin into films. However, since the polylactic acid resin disclosed above has the optimized glass transition temperature in company with such melting temperature, it is superior in melt-processability and makes it possible to provide a film having excellent general properties including the heat resistance in company with the optimized flexibility.

Meanwhile, said polylactic acid resin may be prepared by a method including the steps of: ring-opening (co)polymerizing one or more monomers such as alkylene oxides so as to form a (co)polymer having polyether polyol repeating units; reacting the (co)polymer with a diisocyanate compound in the presence of a catalyst so as to form a (co)polymer having polyurethane polyol repeating units; and polycondensing a lactic acid (D- or L-lactic acid) or ring-opening polymerizing a lactide (D- or L-lactide) in the presence of the (co)polymer having the polyurethane polyol repeating units.

Particularly, the polylactic acid resin having excellent properties disclosed above and the block copolymer included therein can be prepared by reacting a (co)polymer having polyether polyol repeating units and a diisocyanate compound so as to prepare a (co)polymer having the polyurethane polyol repeating unit in which said polyether polyol repeating units are linearly linked via urethane bonds and reacting the same with a lactic acid or a lactide. However, when polyester polyol repeating units are introduced into the polymer instead of the polyether polyol repeating units, or urethane reaction is carried out after the polymerization of the polyether polyol and the lactic acid by changing the order of co-polymerization, it is difficult to prepare the block copolymer having excellent properties disclosed above and the polylactic acid resin including the same.

Furthermore, it may be a main factor enabling for preparing the polylactic acid resin having the properties disclosed above to control the molecular weight of whole polylactic acid resin, the molecular weight of the polyether polyol (co)polymer, or the amount of the (co)polymer having the polyurethane polyol repeating units, corresponding to the soft segment, used, properly. The proper range of the molecular weight of the polylactic acid resin or the content of the soft segment is already disclosed above, and thus more detailed explanations are skipped here.

Hereinafter, the preparation method of polylactic acid resin will be explained in more detail.

First, a (co)polymer having a polyether polyol repeating unit is prepared by a ring-opening polymerization of one or more monomers such as an alkylene oxide, and this can be obtained according to a typical polymerization method of polyether polyol (co)polymers.

Then, the (co)polymer having a polyether polyol repeating unit, an diisocyanate compound, and a urethane reaction catalyst are loaded into a reactor, and subjected to a urethane reaction while heating and stirring. By this reaction, two isocyanate groups of the diisocyanate compound and the terminal hydroxyl groups of the (co)polymer can be combined to form urethane bonds. As a result, a (co)polymer having a polyurethane polyol repeating unit in which the polyether polyol repeating units are linearly linked via a urethane bond can be formed, and serve as a soft segment in the polylactic acid resin. In this context, the polyurethane polyol (co)polymer may be in the form of E-U-E-U-E in which the polyether polyol repeating units (E) are linearly linked via a urethane bond (U), and which has the polyether polyol repeating units at both terminal ends.

The urethane reaction may be obtained in the presence of a tin catalyst, for example, stannous octoate, dibutyltin dilaurate, or dioctyltin dilaurate. In addition, the urethane reaction can be obtained under the typical reaction condition for the preparation of polyurethane resin. For example, the diisocyanate compound and the polyether polyol (co)polymer can be reacted at 70 to 80° C. for 1 to 5 hrs in the presence of a urethane reaction catalyst in a nitrogen atmosphere to afford a (co)polymer having a polyurethane polyol repeating unit.

Subsequently, a polylactic acid resin, particularly a block copolymer included in the same, included in the film of one embodiment can be prepared by a polycondensation reaction of the lactic acid (D- or L-lactic acid) or a ring-opening polymerization of the lactide (D- or L-lactide), in presence of the (co)polymer having a polyurethane polyol repeating unit. That is, according to this polymerization, the polylactic acid repeating unit included as the hard segment is formed and the polylactic acid resin is prepared. At this time, the polyurethane polyol repeating unit is bonded to at least some of the terminal group of the polylactic acid repeating unit and the block copolymer can be produced.

As a result, the block copolymer (included in the film of one embodiment) can be obtained which are quite different in structure and properties from conventional polylactic copolymers or branched copolymers which are prepared from a prepolymer consisting of a polyether polyol and a polylactic acid by chain extension with a diisocyanate compound or by reaction with a tri-functional isocyanate compound, respectively. Particularly, such block copolymer may comprise a block (hard segment) in which the polylactic acid repeating units are linked to each other in a relatively large mass (molecular weight) unit, so that a film made of the polylactic acid resin comprising the block copolymer may have a narrow molecular weight distribution and a proper Tg, and thus may exhibit excellent mechanical properties and heat resistance. In contrast, because the conventional copolymers should have a structure in which polylactic acid repeating units with a small mass (molecular weight) are alternately and randomly distributed together with polyether polyol repeating units, the films obtained therefrom cannot satisfy the aforementioned properties such as glass transition temperature, and have poor mechanical properties or heat resistance.

The ring opening polymerization of lactide may be performed in the presence of a metal catalyst such as an alkaline earth metal, a rare earth metal, a transition metal, aluminum, germanium, tin, or antimony. More specifically, the metal catalyst may be in the form of carbonic acid salts, alkoxide, halide, oxide, or titanium tetraisopropoxide carbonate. Stannous octoate, titanium tetraisopropoxide, or aluminum triisopropoxide can be used as metal catalyst preferably.

As the polylactic acid resin composition comprises a block copolymer in which specific hard segments and soft segments are combined, it can exhibit more improved flexibility while showing biodegradability of the polylactic acid resin. Furthermore, this structure can minimize the bleed-out of the soft segment which is responsible for the flexibility, and can largely prevent the soft segment-induced reduction of mechanical properties, heat resistance, transparency or haze property of the film.

Moreover, since the polylactic acid resin is prepared to have a specific glass transition temperature and optionally a specific melting temperature, the film made of the same can exhibit not only optimized flexibility and stiffness as a packaging material but also excellent workability for a melting process, anti-blocking property, and heat resistance. Accordingly, the polylactic acid resin may be preferably applied to packaging materials such as packaging films.

Hereinafter, the film of one embodiment including the polylactic acid resin will be explained in more detail.

As the film includes said polylactic acid resin, the film can be preferably used as a packaging material in various fields because the film is superior in mechanical properties, heat resistance, anti-blocking property, transparency, and the like and can exhibit optimized flexibility and stiffness, as it includes said polylactic acid resin composition.

The film may have various thickness depending on uses thereof, and thickness of 5 to 500 μm. For example, when the packaging film is used as a wrap film or an envelope, it preferably may have a thickness of 5 to 100 μm in terms of flexibility, workability and strength, more preferably 7 to 50 μm, and further more preferably 7 to 30 μm.

Also, after the film is treated for 1 hr in a 100° C. hot wind oven, it may exhibit weight loss of about 3 wt % or less, preferably about 0.01 to 3.0 wt %, and more preferably about 0.05 to 1.0 wt %. This property may indicate that the packaging film may have excellent heat resistance and anti-bleed out properties. When the rate of weight loss is higher than 3 wt %, the film may have poor dimensional stability, and plasticizers, residual monomers, or additives can bleed out of the film, polluting the content packaged with the film, and it may be difficult to be used as a food packaging material.

The film may exhibit haze of about 3% or less and light transmittance of about 85% or higher. Preferably, it may have haze of about 2% or less with light transmittance of about 90% or higher, and more preferably haze of about 1% or less with light transmittance of about 92% or higher. If the haze is too high or the light transmittance is too low, the film may make it difficult to readily identify the content packaged therewith, and do not allow vivid appearance of a printed image when it is applied to a multilayer film having a print layer.

The film may be provided properties necessary for food packaging materials such as heat sealability, gas barrier against water vapor, oxygen or carbonic acid gas, releasability, printability, and the like which are required for the packaging film, so long as not deteriorating the advantages of the packaging film. For this, the polymer having such properties may be compounded with a thermoplastic resin such as an acryl resin, a polyester resin, or a silicon resin, or an antistatic agent, a surfactant, a releasing agent and so on may be applied to at least one surface of the packaging film. Also, the packaging film may be formed into a multilayer film by coextrusion of other films such as polyolefin sealant. The packaging film may be formed into a multilayer film by adhesion or lamination as well.

Meanwhile, for example, the film disclosed above may be obtained by making the polylactic acid resin into a biaxial drawn film (a biaxial oriented film) with a sequential biaxial stretching process or a concurrent biaxial stretching process, followed by heat setting. In this regard, the formation of the oriented film may be accomplished by melt extruding the polylactic acid resin into sheets structure using an extruder equipped with a T die, thereafter cooling and solidifying the sheet-like extrudate to form an unoriented film (undrawn film), and stretching the unoriented film in both machine direction and transverse direction.

Drawing conditions of the film may be properly adjusted depending on heat shrinkability, dimensional stability, strength, and Young's modulus. For example, in consideration of the strength and flexibility of the final product, the drawing temperature may be preferably adjusted into a point over the glass transition temperature and less than the crystallization temperature of the polylactic acid resin. In addition, the drawing ratio may be set to be about 1.5 to 10 times for each direction, or may differ from the machine direction to the transverse direction.

After the formation of the oriented film, the packaging film may be finally accomplished by heat setting, and the heat setting is preferably performed at 100° C. or higher for about 10 sec for the strength and dimensional stability of the film.

Even after being stored for a long period time, the film may have not only excellent flexibility and transparency but also sufficient mechanical properties such as strength and anti-bleed out property. In addition, the film may have biodegradability which is characteristic of the polylactic acid resin. Therefore, the film may be preferably applied to various packaging fields. For example, the packaging film may be applied to industrial packaging materials including agricultural multi-films, sheets for protecting paint on automobiles, trash envelopes, and compost envelopes in addition to being used as, for example, wrappers and envelopes for daily consumption goods or foods, packaging films for chilled/frozen foods, shrinkable over-wrapping films, bundling films, sanitary films such as sanitary pads or diapers, lamination films, shrinkable label packaging films, and mat films for packaging confectioneries.

Advantageous Effect of the Invention

As described above, the present invention provides a polylactic acid resin and a packaging film having optimized flexibility and stiffness, excellent mechanical properties, heat resistance, transparency, anti-blocking property, workability of a film, and the like while exhibiting biodegradability due to the nature the polylactic acid resin. Therefore, the polylactic acid resin and the packaging film can be applied to various fields as packaging materials, replacing packaging films made of petroleum-based resins and making a great contribution to prevention of environmental pollution.

DETAILS FOR PRACTICING THE INVENTION

The present invention will be explained in detail with reference to the following examples. However, these examples are only to illustrate the invention, and the scope of the invention is not limited thereto.

Definitions of Physical Properties and Measuring Methods:
physical properties stated in the following Examples are defined and measured as follows.

(1) NCO/OH: molar ratio of "isocyanate group of diisocyanate compound (e.g., hexamethylene diisocyanate)/terminal hydroxyl group of polyether polyol repeating unit (or (co)polymer)" for a reaction to form polyurethane polyol repeating units.

(2) OHV (KOH mg/g): measured by dissolving the polyurethane polyol repeating unit (or (co)polymer) in dichloromethane, acetylating the repeating unit, hydrolyzing the acetylated repeating unit to generate acetic acid, and titrating the acetic acid with 0.1 N KOH in methanol. It corresponds to the number of terminal hydroxyl groups of the polyurethane polyol repeating units (or (co)polymer).

(3) Mw and Mn (g/mol) and molecular weight distribution (Mw/Mn): measured by applying a 0.25 wt % solution of polylactic acid resin in chloroform, and gel permeation chromatography (manufactured by Viscotek TDA 305, Column: Shodex LF804*2ea). Polystyrene was used as a standard material to determine weight average molecular weight (Mw) and number average molecular weight (Mn). A molecular weight distribution was calculated from Mw and Mn.

(4) Tg (glass transition temperature, ° C.): measured with a differential scanning calorimeter (manufactured by TA Instruments) while quenching the melted sample and then increasing the temperature of the sample at a rate of 10° C./minute. The Tg was determined from the mid value of tangential line of an endothermic curve and a base line.

(5) Tm (melting temperature, ° C.): measured with a differential scanning colorimeter (manufactured by TA Instruments) while quenching the melted sample and then elevating the temperature of the sample at a rate of 10° C./min. The Tm was determined from the maximum value of the melt endothermic peak of the crystal.

(6) Content of polyurethane polyol repeating unit (wt %): the content of polyurethane polyol repeating unit in prepared polylactic acid resin was measured using a 600 MHz nuclear magnetic resonance (NMR) spectrometer.

(7) Extrusion state: The polylactic acid resin was extruded at 200 to 250° C. into a sheet phase using a 30 mm single screw extruder equipped with a T die and the extruded sheet was electrostatically deposited on a casting drum cooled to 5° C. so as to prepare an undrawn sheet. At this time, the melt viscosity of the extrudated sheet was measured using Physica Rheometer (Physica, USA). In detail, while maintaining the initial temperature of the extrudate, a shear force was applied thereto by a 25 mm parallel plate type instrument with a shear rate (1/s) of 1 during which complex viscosity (Pa·s) of the melted resin was measured with the Physica Rheometer. The states of melt viscosity (extrusion states) were evaluated according to the following standards.

ⓞ: melt viscosity is good enough to perform winding around the cooling drum, ○: melt viscosity is slightly low and winding is possible although difficult, x: melt viscosity is too low to wind.

(8) Initial tensile strength (kgf/mm$^2$) MD, TD: A film sample with 150 mm in length and 10 mm in width was conditioned at a temperature of 20° C. and a humidity of 65% RH for 24 hrs, and measured the tensile strength according to ASTM D638 using Universal test machine (manufactured by INSTRON) at a drawing speed of 300 mm/min with the distance of 100 mm between grips. A mean value of five measurements was expressed. MD and TD stand for machine direction and transversal direction of the film, respectively.

(9) Elongation ratio (%) MD, TD: The elongation ratio was determined at the point when the film was torn under the same condition as in the tensile strength test of (8). A mean value of five measurements was expressed. MD and TD stand for machine direction and transversal direction of the film, respectively.

(10) F5 (kgf/mm$^2$) MD, TD: In the stress-strain curve obtained in the tensile strength test of (8), a tangential value at a stress point of 5% strain was determined, and a stress value at 5% elongation was obtained from the tangential slope. A mean value of five measurements was expressed. MD and TD stand for machine direction and transversal direction of the film, respectively.

(11) F100 (kgf/mm$^2$) MD: In the stress-strain curve obtained in the tensile strength test of (8), a tangent value at a stress point of 100% strain was determined, and a stress value at 100% elongation was obtained from the tangential slope. A mean value of five measurements was expressed. MD and TD stand for machine direction and transversal direction of the film, respectively.

(12) Young's modulus (kgf/mm$^2$) MD, TD: The same film sample as in the tensile strength test of (8) was measured for Young's modulus according to ASTM D638 using UTM (manufactured by INSTRON) at a drawing speed of 300 mm/min with a distance between grips of 100 mm. A mean value of five measurements was expressed. As the Young's modulus, particularly, a sum of Young's modulus values measured in machine direction and transversal direction, corresponds to the flexibility of the film, a lower Young's modulus value may indicate higher flexibility. MD and TD stand for machine direction and transversal direction of the film, respectively.

(13) Wave pattern (horizontal line): Degrees of the wave patterns which are produced due to a difference in melt viscosity when two kinds of resins with different molecular weights or a resin and a plasticizer are compounded and extruded into a film are evaluated on an A4-size film sample according to the following criteria.

ⓞ: no wave patterns (horizontal lines), ○: Up to 3 wave patterns (horizontal lines), x: 5 or more wave patterns (horizontal lines).

(14) 100° C. Rate of weight loss (%): A film sample was conditioned for 24 hrs at 23° C. and 65% RH and weighed before heat treatment. Then, it was treated for 60 min in a 100° C. hot wind oven, and again conditioned under the same conditions as in pre-heat treatment, and weighed. Percentages of the pre-treatment weight to the changes between pre- and post-treatment processes were calculated.

(15) Pin hole and anti-bleed-out: After the heat treatment of (15), the surface of the film sample was observed to examine the generation of pin holes. In addition, the bleed-out of the low-molecular weight plasticizer on the film surface was evaluated with tactile sensation on an A4-size film sample according to the following criteria.

ⓞ: neither pin holes nor bleed-out, ○: up to 5 pin holes or bleed-out observed, but not serious, x: 5 or more pin holes or serious bleed-out.

(16) Haze (%) and light transmittance (%): A film sample was conditioned for 24 hrs at 23° C. and 65% RH, and the average haze value was measured at three different points according to JIS K7136 using a haze meter (Model Japan NDH2000).

(17) Anti-blocking property: The antistatic surface of a film sample was matched with the print surface by using COLORIT P type stamping of foil (Kurz), and left for 24 hrs at 40° C. under a pressure of 1 kg/cm², thereafter the blocking between the antistatic layer and the print surface was observed.

Based on the observation, the anti-blocking property of the film between the anti-static layer (layer A) and the print surface of the in-mold transfer foil was evaluated according to the following criteria. Practical performance is guaranteed by at least ○.

⊙: no changes, ○: slight surface change (less than 5%), x: defoliated by 5% or higher.

Materials used in the following Examples and Comparative Examples are given as follows:

1. Polyether Polyol Repeating Unit (or (Co)Polymer) or Correspondents Thereto
   PPDO 2.4: poly(1,3-propanediol); number average molecular weight 2400
   PPDO 2.0: poly(1,3-propanediol); number average molecular weight 2000
   PPDO 1.0: poly(1,3-propanediol); number average molecular weight 1000
   PTMEG 3.0: polytetramethylene glycol; number average molecular weight 3000
   PTMEG 2.0: polytetramethylene glycol; number average molecular weight 2000
   PTMEG 1.0: polytetramethylene glycol; number average molecular weight 1000
   PEG 8.0: polyethylene glycol; number average molecular weight 8000
   PBSA 11.0: aliphatic polyester polyol prepared by the polycondensation of 1,4-butanediol, succinic acid, and adipic acid; number average molecular weight 11,000
2. Diisocyanate Compound (or Tri- or Higher Functional Isocyanate)
   HDI: hexamethylenediisocyanate
   D-L75: Bayer, Desmodur L75 (TRIMETHYLOL PROPANE+3 toluene diisocyanate)
3. Lactide Monomer
   L- or D-lactide: product manufactured by Purac, optical purity of 99.5% or higher
4. Antioxidants, etc.
   TNPP: Tris(nonylphenyl) phosphite
   U626: Bis (2,4-di-tbutylphenyl)Pentaerythritol Diphosphite
   S412: Tetrakis[methane-3-(laurylthio)propionate]methane
   PEPQ: (1,1'-Biphenyl)-4,4'-Diylbisphosphonous acid tetrakis[2,4-bis(1,1-dimethylethyl)phenyl]ester
   I-1076: octadecyl 3-(3,5-di-tert-butyl-4-hydroxyphenyl) propionate
   O3: Bis[3,3-bis-(4'-hydroxy-3'-tert-butyl-phenyl)butanoicacid]glycol ester A. Preparation of Polylactic Acid Resins A to H According to the instructions shown in Table 1 below, reactants and catalyst were fed into an 8 L reactor equipped with a nitrogen tube, a stirrer, a catalyst inlet, an effluent condenser and a vacuum system. As the catalyst, dibutyltin dilaurate was used in an amount of 130 ppm based on the total weight of the reactants. Under a nitrogen atmosphere, a urethane reaction was carried out at 70° C. for 2 hrs, and then 4 kg of L-(or D-) lactide was fed into the reactor, followed by five times of nitrogen flushing.

Subsequently, the temperature was elevated to 150° C. to completely dissolve the L-(or D-) lactide, and tin 2-ethylhexylate catalyst of 120 ppm per the total content of the reactants was diluted in 500 ml toluene and the diluted solution was fed into the reactor through the catalyst inlet. Under a nitrogen pressure of 1 kg, the reaction was carried out at 185° C. for 2 hrs, and then phosphoric acid was fed in an amount of 200 ppm through the catalyst inlet and blended with the reaction mixture for 15 minutes to inactivate the catalyst. After the catalyst deactivation, the vacuum was applied until the pressure reached 0.5 torr to remove unrelated L-(or D-) lactide. The molecular weight, Tg, Tm, and so on of the obtained resin were measured and given in Table 1.

B. Preparation of Polylactic Acid Resin L

According to the instructions shown in Table 1 below, polyol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppm of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppm through the catalyst inlet and blended with the reaction mixture for 15 minutes to inactivate the catalyst. Until the pressure reached 0.5 torr, vacuum was applied to remove unreacted L-lactide. The molecular weight, Tg, Tm, and so on of the obtained resin were measured and given in Table 1.

C. Preparation of Polylactic Acid Resin M

According to the instructions shown in Table 1 below, 6 g of 1-dodecanol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppm of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppm through the catalyst inlet and blended with the reaction mixture for 15 minutes to inactivate the catalyst. Until the pressure reached 0.5 torr, vacuum was applied to remove unreacted L-lactide. The molecular weight, Tg, Tm, and so on of the obtained resin were measured and given in Table 1.

D. Preparation of Polylactic Acid Resin O

According to the instruction shown in Table 1 below, PBSA polyol (polyester polyol) and HDI were fed into an 8 L reactor equipped with a nitrogen tube, a stirrer, a catalyst inlet, an effluent condenser and a vacuum system, followed by five times of nitrogen flushing. As a catalyst, dibutyltin dilaurate was used in an amount of 130 ppm based on the total weight of the reactants. Under a nitrogen atmosphere, a urethane reaction was carried out at 190° C. for 2 hrs, and then 4 kg of L-lactide was fed into the reactor, and completely dissolved at 190° C. in a nitrogen atmosphere. Tin 2-ethylhexylate as an addition polymerization catalyst, and dibutyltin dilaurate as an ester and/or ester amide exchange catalyst were diluted in amounts of 120 ppm and 1000 ppm, respectively, based on the total weight of the reactants, in 500 ml of toluene, and added to the reactor. Under a nitrogen pressure of 1 kg, the reaction was carried out at 190° C. for 2 hrs, after which phosphoric acid was fed in an amount of 200 ppm through the catalyst inlet and blended with the reaction mixture for 15 minutes to inactivate the catalysts. Until the pressure reached 0.5 torr, vacuum was applied to remove unreacted L-lactide. The molecular weight, Tg, Tm, and so on of the obtained resin were measured and given in Table 1.

E. Preparation of Polylactic Acid Resin P

According to the instructions shown in Table 1 below, PEG, 3.6 kg of L-lactide, and 0.4 kg of D-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppm of the catalyst tin 2-ethylhexylate in 500 ml of toluene was fed into the reactor through the catalyst inlet. Under a nitrogen pressure of 1 kg, the reaction was carried out at 185° C. for 2 hrs, after which phosphoric acid was fed in an amount of 200 ppm through the catalyst inlet and blended with the reaction mixture for 15 minutes to inactivate the catalyst. Until the pressure reached 0.5 torr, vacuum was applied to remove unreacted L-lactide. Then, HDI and a dilution of 120 ppm of the catalyst dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight, Tg, Tm, and so on of the obtained resin were measured and given in Table 1.

F. Preparation of Polylactic Acid Resin R

According to the instructions shown in Table 1 below, PEG, 3.6 kg of L-lactide, and 0.4 kg of D-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppm of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppm through the catalyst inlet and blended with the reaction mixture for 15 minutes to inactivate the catalyst. Until the pressure reached 0.5 torr, vacuum was applied to remove unreacted L-lactide. Then, D-L75 and a dilution of 120 ppm of the catalyst dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight, Tg, Tm, and so on of the obtained resin were measured and given in Table 1.

G. Examples 1 to 5 and Comparative Examples 1, 2, and 6 to 8

Film Formation

The polylactic acid resins prepared in A to F were dried at 80° C. for 6 hrs under a reduced pressure of 1 torr, and then extruded into a sheet structure using a 30-mm single screw extruder equipped with a T die under the temperature conditions shown in Table 2. The extruded sheets were electrostatically deposited on a casting drum cooled to 5° C. to give unoriented films (undrawn films). They were stretched to 3 times in a machine direction between heating roles under the drawing conditions shown in Table 2. Subsequently, the films were fixed with clips, then stretch to 4 times in a tenter frame, and fixed again in the transverse direction, followed by heat treatment at 120° C. for 60 sec to afford a bi-axially oriented polylactic acid resin film of 20 μm thick. The evaluation results of the films are summarized in Table 2.

H. Example 6 and Comparative Examples 3 to 5

Film Formation

The resin compositions or polyols shown in Table 2 were dried at 80° C. for 6 hrs under a reduced pressure of 1 torr, and melt kneaded at 190° C. in a twin screw kneader to give chips of the composition. They were dried at 80° C. for 6 hrs under a reduced pressure of 1 torr, and produced into a bi-axially oriented polylactic acid resin film of 20 μm thick in the same manner as in G. The evaluation results of the films are summarized in Table 2.

TABLE 1

| | Resin | | | | | | | | | | |
|---|---|---|---|---|---|---|---|---|---|---|---|
| | A | B | C | D | E | H | L | M | O | P | R |
| PPDO 2.4 (g) | | 378.8 | | | | | | | | | |
| PPDO 2.0 (g) | | | | | | | 114.6 | | | | |
| PPDO 1.0 (g) | | | 209.5 | | | | | | | | |
| PTMEG 3.0 (g) | 386.9 | | | | | | | | | | |
| PTMEG 2.0 (g) | | | | | 755.5 | | | | | | |
| PTMEG 1.0 (g) | | | | 184.8 | | | | | | | |
| PEG 8.0 (g) | | | | | | | | 2400 | | 800 | 800 |
| PBSA 11.0 (g) | | | | | | | | | 800 | | |
| HDI (g) | 13.1 | 21.2 | 30.5 | 15.2 | 44.4 | 5.38 | | | 9.5 | 10.1 | |
| D-L75 | | | | | | | | | | | 20 |
| NCO/OH | 0.60 | 0.80 | 0.90 | 0.50 | 0.70 | 0.55 | | | 0.8 | 0.7 | 0.85 |
| OHV(KOHmg/g) | 10 | 6 | 4 | 20 | 6 | 19 | 47 | | 3 | 5.5 | 2.5 |

TABLE 1-continued

| | Resin | | | | | | | | | | |
|---|---|---|---|---|---|---|---|---|---|---|---|
| | A | B | C | D | E | H | L | M | O | P | R |
| TNPP (g) | | | 4 | | 0.4 | | 3 | | | | |
| U626 (g) | 2 | 3 | | | | | | 3 | | | |
| PEPQ (g) | | | | 4 | | | | | | | |
| S412 (g) | | | | 2 | | | | | | | |
| I-1076 (g) | | 1 | | | | | | | | | |
| O3 (g) | 2 | | | | | | | | | | |
| L-Lactide (g) | 4,000 | | 4,000 | | 4,000 | 4,000 | 4,000 | 4,000 | 4000 | 3600 | 3600 |
| D-Lactide (g) | | 4,000 | | 4,000 | | | | | | 400 | 400 |
| PU polyol repeating unit Content (wt %) | 10 | 10 | 6 | 5 | 17 | 4 | 39 | 0 | 18 | 18 | 17 |
| Mw (g/mol) | 148K | 245K | 315K | 115K | 149K | 127K | 26K | 295K | 65K | 60K | 85K |
| Mn (g/mol) | 75K | 122K | 148K | 60K | 70K | 275K | 14K | 128K | 185K | 150K | 421K |
| MW distribution (Mw/Mn) | 1.97 | 2.01 | 2.13 | 1.92 | 2.13 | 2.17 | 1.86 | 2.30 | 2.85 | 2.50 | 4.95 |
| Tg (° C.) | 49 | 42 | 54 | 55 | 31 | 62 | 15 | 65 | 18 | 22 | 12 |
| Tm (° C.) | 170 | 168 | 172 | 173 | 164 | 176 | 130 | 176 | 85, 165 | 145 | 138 |

As shown in the Table 1, resins A~E were polylactic acid resins (block copolymers) which were prepared by reacting poly(1,3-propanediol) having a molecular weight of 1000 to 2400 or polytetramethylene glycol having a number average molecular weight of 1000 to 3000 with 1,6-hexamethylene diisocyanate at a molar ratio of NCO/OHV of 0.5 to 0.99 to give a polyurethane polyol repeating unit (or (co)polymer) in which polyether polyol repeating units, such as poly(1,3-propanediol), were linearly linked, and using the same as a soft segment and as an initiator for the polymerization of a hard segment. Furthermore, the polylactic acid resins include the soft segment of the polyurethane polyol repeating units with proper contents of 5 to 20 wt %.

In the polylactic acid resins, the polyurethane polyol repeating unit (or (co)polymer) was found to have an OHV of from 3 to 20, so that they could act as an initiator for the polymerization of polylactic acid repeating units. In addition, the final polylactic acid resins A to E had a weight average molecular weight of 100,000 to 400,000, a molecular weight distribution of 1.80 to 2.15, Tg of 25 to 55° C., and Tm of 160 to 178° C. Given these thermal parameters, the resin can be prepared into chips, and they alone can be produced into films, as the resins exhibit a suitable melt viscosity at a film extrusion temperature, e.g., 200° C. or higher.

In contrast, it was recognized that resin H in which the content of the amount used of the polyurethane polyol repeating unit (or (co)polymer), the soft segment, was less than 5 wt % showed Tg higher than 55° C. And, since resin J comprises the polyurethane polyol repeating units (or (co)polymer) in an amount exceeding 20 wt % which is considerably high, the final polylactic acid resin prepared has a weight average molecular weight of less than 100,000 with a glass transition temperature of less than 25° C.

And, resin L was the polylactic acid resin prepared by directly utilizing a polyethylene glycol having a molecular weight of 8000 as an initiator for the ring-opening polymerization of L-lactide without a urethane reaction. In this case, however, the OHV of the initiator was too high to obtain a polylactic acid resin with a desired weight average molecular weight. Furthermore, it was recognized that resin L showed the Tg of just 15° C. and had low polymerization conversion, and the resin was too low in melt viscosity to be produced into a film alone at a film extrusion temperature of 200° C. or more.

Resin M was the polylactic acid resin prepared by a ring opening polymerization of L-lactide using a small amount of 1-dodecanol as an initiator according to a conventional preparation method of a polylactic acid resin, without introducing a soft segment (polyurethane polyol repeating unit). This polylactic acid resin alone could be produced into a film at a film extrusion temperature of 200° C. or higher. However, it was found to have a molecular weight distribution of as large as 2.30 which is very broad.

Also, resin O was the polylactic copolymer which was prepared by employing a polyurethane formed from a polyester polyol repeating unit, such as PBSA, instead of the polyether polyol repeating unit, as a soft segment while copolymerizing the polyurethane with lactide in the presence of a ring opening polymerization catalyst, an ester exchange catalyst, and/or an ester amide exchange catalyst. In this polylactic copolymer, the polyurethane was randomly introduced in small segment sizes and copolymerized with the polylactic acid repeating unit during the ester and/or ester amid exchange reaction. Resin O had as wide a molecular weight distribution as 2.85, and its Tg was low and its Tm was relatively low as well.

Finally, resins P and R were a polylactic copolymer (P) or a branched copolymer (R) which were prepared by addition polymerization of polyether polyol repeating units with lactide to form a prepolymer and then by subjecting the prepolymer to chain extension with a diisocyanate compound (copolymer P) or to a reaction with a tri-functional isocyanate compound (copolymer R), respectively. Resins P and R had as wide a molecular weight distribution as 2.50 and 3.91, and their Tg were excessively low in comparison with the present invention and their Tm were relatively low as well.

TABLE 2

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Resin 1 (wt %) | A100 | B100 | C100 | D100 | E100 | E50 | M100 | H100 | L40 | PPDO10 | PBSA10 | O100 | P100 | R100 |
| Resin 2 (wt %) | | | | | | M50 | | | M60 | M90 | M90 | | | |
| Extrusion Temp. (° C.) | 220 | 230 | 240 | 200 | 200 | 240 | 240 | 240 | 200 | 200 | 200 | 200 | 200 | 250 |
| Melt Visco. (Pa·s) | 1100 | 1600 | 2100 | 580 | 1000 | 1400 | 2000 | 1600 | 250 | 1200 | 1400 | 1400 | 1200 | 4000 |
| Extrusion state | ◎ | ◎ | ◎ | ○ | ◎ | ◎ | ◎ | ○ | X | ○ | ○ | ◎ | X | X |
| Drawing Temp. (° C.) | 81 | 80 | 80 | 70 | 80 | 80 | 80 | 80 | 80 | 80 | 80 | 80 | 80 | Cannot be extruded into a film because of gel particles |
| Drawing Time (sec) | 20 | 20 | 20 | 30 | 20 | 20 | 20 | 20 | 20 | 20 | 20 | 20 | 20 | |
| Drawing Ratio | 3x4 | 3x4 | 3x4 | 3x4 | 3x4 | 3x4 | 3x4 | 3x4 | 3x4 | 3x4 | 3x4 | 3x4 | 3x4 | |
| Film Thick. (um) | 20 | 20 | 20 | 21 | 20 | 20 | 21 | 20 | 20 | 20 | 20 | 20 | 20 | |
| Initial Tensile Strength (kgf/mm2) MD | 10 | 15 | 18 | 10 | 12 | 17 | 20 | 18 | 2.5 | 15 | 9 | 7 | 6 | |
| Initial Tensile Strength (kgf/mm2) TD | 13 | 20 | 25 | 14 | 14 | 22 | 26 | 23 | 3.1 | 18 | 10 | 8 | 7 | |
| Sum of Tensile Strength (kgf/mm2) | 23 | 35 | 43 | 24 | 26 | 39 | 46 | 41 | 5.6 | 33 | 19 | 15 | 13 | |
| Elongation Rate (%) MD | 117 | 140 | 120 | 144 | 160 | 137 | 124 | 127 | 152 | 145 | 135 | 212 | 210 | |
| Elongation Rate (%) TD | 70 | 70 | 75 | 78 | 98 | 89 | 86 | 85 | 89 | 66 | 98 | 105 | 98 | |
| F5 (kgf/mm$^2$) MD | 5.3 | 8 | 10 | 5 | 4.8 | 9.4 | 9.8 | 9.2 | 1.5 | 8.7 | 7.9 | 5 | 6 | |
| F5 (kgf/mm$^2$) TD | 8.1 | 10 | 11 | 7.7 | 7.8 | 12.1 | 11.5 | 11.2 | 2.1 | 10.8 | 9.8 | 6.5 | 6.8 | |
| F100 (kgf/mm$^2$) MD | 8.1 | 15 | 16 | 6.7 | 12 | 16.7 | 17.1 | 16.5 | 1.8 | 5.6 | 6.1 | 4.2 | 4.5 | |
| Young's Modulus (kgf/mm2) MD | 236 | 230 | 330 | 212 | 180 | 242 | 386 | 361 | 179 | 338 | 327 | 150 | 160 | |
| Young's Modulus (kgf/mm2) TD | 295 | 280 | 418 | 319 | 235 | 300 | 460 | 435 | 241 | 419 | 412 | 165 | 175 | |
| Sum of Young's Modulus (kgf/mm2) | 531 | 510 | 748 | 531 | 415 | 542 | 846 | 796 | 420 | 757 | 739 | 315 | 335 | |
| Wave pattern | ◎ | ◎ | ◎ | ◎ | ◎ | ◎ | ◎ | ◎ | X | ○ | ○ | ◎ | X | |
| Pin hole | ◎ | ◎ | ◎ | ◎ | ◎ | ◎ | ◎ | ◎ | ◎ | ◎ | ○ | X | X | |
| 100° C. Rate of weight loss (%) | 0.2 | 0.2 | 0.15 | 0.3 | 0.40 | 0.25 | 0.2 | 0.4 | 6.0 | 5.1 | 5.5 | 7.2 | 3.8 | |
| Bleed-out | ◎ | ◎ | ◎ | ◎ | ◎ | ◎ | ◎ | ◎ | ◎ | X | X | ○ | ○ | |
| Haze (%) | 0.2 | 0.2 | 0.2 | 0.3 | 0.3 | 0.2 | 0.74 | 0.2 | 0.7 | 10 | 14 | 2.1 | 1.1 | |

TABLE 2-continued

|  | Example | | | | | | Comparative Example | | | | | | | |
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| Transmittance (%) | 94 | 94 | 94 | 94 | 93 | 94 | 94 | 94 | 87 | 89 | 81 | 84 | 84 |  |
| Anti-blocking Property | ◎ | ◎ | ◎ | ◎ | ○ | ○ | ◎ | ◎ | X | ○ | ○ | X | X |  |

As shown in the Table 2, the films of Examples 1 to 5 were prepared from the polylactic acid resin of the present invention including the soft segment (polyurethane polyol repeating unit) of 5 to 20 wt % and having a weight average molecular weight of 100,000 to 400,000, a molecular weight distribution of 1.80 to 2.15, and Tm of 160 to 178° C. Furthermore, the film of Example 6 was prepared by using the polylactic acid resin (resin E) falling into the category of the present invention and a general polylactic acid resin (resin M).

All of the films of Examples 1 to 6 were found to have a total initial tensile strength in both machine direction and transverse direction of 20 kgf/mm² or higher, which indicates excellent mechanical properties. In addition, they maintained a proper range of total Young's modulus in both machine direction and transverse direction of 350 to 750 kgf/mm², which reflects excellent flexibility. This optimized range of total Young's modulus was helpful in maintaining a suitable level of stiffness. Also, they were found to be superior in various physical properties including transparency, haze, anti-blocking property, and heat resistance as demonstrated by a rate of weight loss of 3 wt % or less after treatment for 1 hr in a 100° C. hot wind oven, a haze of 5% or less, and a light transmittance of 90% or higher.

In contrast, the film of Comparative Example 1 which was prepared from general polylactic acid resin M exhibited a total Young's modulus in both machine direction and transverse direction of exceeding 750 kgf/mm², so that the flexibility was too insufficient to use the film as a packaging film. In addition, the extrusion state of the film of Comparative Example 3 made from resins M and L together was poor, because of large difference of melt viscosity between the two resins. Wave patterns were also found in the final film. Furthermore, the appearance of the film was poor due to pin holes on the film generated, and the excessively low Tg of resin L caused a problem to the anti-blocking property. The initial tensile strength and the light transparency were poor as well.

And, in Comparative Examples 4 and 5, the films were formed by just compounding poly(1,3-propanediol) having a number average molecular weight of 2400 and an aliphatic polyester polyol having a number average molecular weight of 11,000 prepared by a polycondensation of 1,4-butanediol, succinic acid, and adipic acid with resin M as plasticizing components, without using the polyurethane polyol repeating unit, the soft segment of the resin. The films of Comparative Examples 4 and 5 had high haze because of the incomplete dispersion of the plasticizing components in the resin, and it was recognized that the plasticizing components bleed out from the surface of the film after time passes.

And, resin H of Comparative Example 2 had relatively high Tg because of low content of the soft segments. On this account, it was recognized that the film obtained from resin H had insufficient flexibility and was hard to be used for packaging because it had a total Young's modulus in both machine direction and transverse direction of exceeding 750 kgf/mm².

And, the film of Comparative Example 6 was formed of a copolymer which did not satisfy the characteristics of the present invention because it included a polyester polyol repeating unit and had low Tg. This film exhibited relatively good flexibility because polyurethane components responsible for flexibility were randomly introduced as small segment units. Nonetheless, it was difficult to be formed to the film because it exhibited a blocking problem as well as poor heat resistance due to low Tg and Tm, as the polylactic acid repeating units were introduced in relatively small sizes as well. In addition, the film was high in haze with low transparency due to low compatibility between the polyester polyols and the polylactic acids, both responsible for the flexibility. A wide molecular weight distribution appeared due to the ester and/or ester amide exchange reaction during the preparation of the resin incurred non-uniform melt properties, and deterioration in the film extrusion state and mechanical properties.

The films of Comparative Examples 7 and 8 were formed of the resins which were prepared by addition polymerizing of polyether polyol with lactide to form a prepolymer and then by subjecting the prepolymer to urethane reaction with diisocyanate or tri- or higher functional compounds. These resins also did not satisfy the structural characteristics of the polylactic acid resin of the present invention or the characteristics of the film of the present invention. These films were also found to exhibit non-uniform melt viscosity and poor mechanical properties. Furthermore, since the block characteristics of the hard segment and the soft segment of the resin were deteriorated and the resin had low Tm and Tg, the resin had low heat resistance followed by difficulties in forming into a film due to a blocking problem.

Furthermore, the polylactic acid resins were degraded during the preparation or use of the films of Comparative Examples 6 to 8, because an excess amount of the catalyst was employed in the preparation of the films. Thus, it generated pin holes and a significant weight change at high temperatures, exhibiting poor stability.

What is claimed is:

1. A polylactic acid resin film, comprising a polylactic acid resin including:
   a hard segment comprising a polylactic acid repeating unit of the following Chemical Formula 1; and
   a soft segment comprising a polyurethane polyol repeating unit in which structures of the following Chemical Formula 2 are linearly linked to each other via a urethane bond, wherein the urethane bond is bonded directly to each of the structures of Chemical Formula 2,
   wherein the total Young's modulus in both machine direction and transverse direction of the film is 350 to 750 kgf/mm², and the total initial tensile strength in both machine direction and transverse direction of the film is 20 kgf/mm² or more:

[Chemical Formula 1]

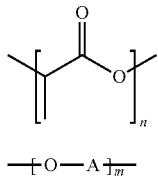

[Chemical Formula 2]

$$-\!\!\left[\!O\!-\!A\right]_{\overline{m}}\!\!-$$

wherein A is a linear or branched alkylene of 2 to 5 carbon atoms, m is an integer of 10 to 100, and n is an integer of 700 to 5000.

2. The film of claim 1, showing a haze of 3% or less and a light transmittance of 85% or higher.

3. The film of claim 1, wherein the polylactic acid resin has a melting temperature (Tm) of 160 to 178° C. and a glass transition temperature (Tg) of 25 to 55° C.

4. The film of claim 1, having a rate of weight loss of 0.01 to 3.0 wt % after being treated at 100° C. for 60 min.

5. The film of claim 1, wherein the urethane bond is formed by a reaction between a terminal hydroxyl group of the structures of Chemical Formula 2 and a diisocyanate compound, and the structures of Chemical Formula 2 are linearly linked via the urethane bond to form the polyurethane polyol repeating unit.

6. The film of claim 5, wherein the polylactic acid resin includes a block copolymer in which a terminal carboxyl group of the polylactic acid repeating unit included in the hard segment and a terminal hydroxyl group of the polyurethane polyol repeating unit are linked via an ester bond.

7. The film of claim 6, wherein the polylactic acid resin comprises the block copolymer; and the polylactic acid repeating unit which remains unlinked to the polyurethane polyol repeating unit.

8. The film of claim 5, wherein a molar ratio of the terminal hydroxyl group of the structure of Chemical Formula 2 and the isocyanate group of the diisocyanate compound is 1:0.50 to 1:0.99.

9. The film of claim 1, wherein the polylactic acid resin comprises 80 to 95 wt % of the hard segment and 5 to 20 wt % of the soft segment.

10. The film of claim 1, wherein the polylactic acid resin has a weight average molecular weight of 100,000 to 400,000.

11. The film of claim 1, which is used for packaging.

12. The film of claim 1, which is a biaxial oriented film.

13. The film of claim 1, having a thickness of 5 to 500 μm.

* * * * *